(12) United States Patent
Belanger et al.

(10) Patent No.: US 11,567,245 B2
(45) Date of Patent: *Jan. 31, 2023

(54) METHOD FOR PRODUCING A HOLOGRAPHIC ARTICLE

(71) Applicants: Jonah Belanger, Columbia, MO (US); Ryan Fitzpatrick Richards, Riverside, IL (US)

(72) Inventors: Jonah Belanger, Columbia, MO (US); Ryan Fitzpatrick Richards, Riverside, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/186,694

(22) Filed: Feb. 26, 2021

(65) Prior Publication Data

US 2021/0215860 A1 Jul. 15, 2021

Related U.S. Application Data

(63) Continuation of application No. 16/514,330, filed on Jul. 17, 2019, now Pat. No. 10,962,693.

(60) Provisional application No. 62/855,458, filed on May 31, 2019.

(51) Int. Cl.
*G02B 5/08* (2006.01)
*H04N 5/225* (2006.01)
*A63B 43/06* (2006.01)

(52) U.S. Cl.
CPC .......... *G02B 5/0808* (2013.01); *A63B 43/06* (2013.01); *H04N 5/2256* (2013.01); *A63B 2209/00* (2013.01); *A63B 2243/0025* (2013.01); *A63B 2243/0037* (2013.01); *A63B 2243/0095* (2013.01)

(58) Field of Classification Search
CPC ........ G02B 5/0808; G02B 1/10; A63B 43/06; A63B 2209/00; A63B 2243/0025; A63B 2243/0037; A63B 2243/0095; H04N 5/2256; G06T 11/001
See application file for complete search history.

(56) References Cited

U.S. PATENT DOCUMENTS

| 5,762,573 | A | * | 6/1998 | Kennedy, III | G03H 1/02 473/570 |
| 9,726,793 | B2 | * | 8/2017 | Han | G02B 5/128 |
| 2010/0142014 | A1 | * | 6/2010 | Rosen | G03H 1/0841 359/1 |
| 2015/0212243 | A1 | * | 7/2015 | Oldknow | G02B 5/124 206/315.3 |
| 2015/0334307 | A1 | * | 11/2015 | Thurairatnam | H04N 5/23216 348/333.01 |

FOREIGN PATENT DOCUMENTS

CN 105386330 * 3/2016 ............... D06N 3/14

* cited by examiner

*Primary Examiner* — Nhan T Tran
(74) *Attorney, Agent, or Firm* — Lambert Shortell & Connaughton; David J. Connaughton, Jr.; Justin P. Tinger

(57) ABSTRACT

A method for manufacturing an article that records a holographic image when photographed or videotaped but otherwise not visible to the naked eye. The article, such as a basketball, includes at least a layer of polyurethane leather that is reflective and is illuminated on photographic media when imaged. The illuminated or holographic image may be seen and displayed on a digital device, such as a social media platform.

20 Claims, 3 Drawing Sheets

METHOD FOR PRODUCING A HOLOGRAPHIC ARTICLE

REFERENCE TO RELATED APPLICATIONS

This application claims the priority benefit of nonprovisional patent application Ser. No. 16/514,330, filed Jul. 17, 2019, which claims the priority benefit of provisional patent application Ser. No. 62/855,458, filed May 31, 2019 both of which are titled Method for Producing Holographic Article and incorporated in their entireties herein by reference.

BACKGROUND OF THE INVENTION

This invention relates generally to reflective articles and, more particularly, a method for producing a holographic article on recordable digital media, the article preferably relating to sports-related gear. More particularly, the article may be constructed of a reflective leather material that produces an illuminated or holographic effect when exposed to the flash or light of a video camera.

In recent times, users of the internet desire to post pictures and videos of interest to their followers in a quest to receive the gratification of "likes," more followers, or to be viewed by so many people to qualify as "going viral." Purveyors of interesting videos may have their own YouTube™ channel, Facebook™ page, or other social media platforms. Pictures or videos of sports gear or other articles provide excellent subject matter for videos, especially if they display vibrant or photogenic color schemes.

In the past, reflective materials have been applied to an outer surface of an article so that the colors of the applied materials display vibrant color variations to the naked eye of onlookers. The applied reflective materials may be powder or paint and may be applied as needed over time or be included in the manufacturing process. In addition, the display may be enhanced by a light source being activated and directed toward the article.

Although presumably effective for their intended purposes, there is now a need for an article to display a glow, radiance, or holographic effect that is not visible to the naked eye of a person but, rather, that is only captured by a still or video camera having a light source directed at the article while capturing a recording of the article. Therefore, it would be desirable to have an article, such as sports-related gear, that that produces an illuminated or holographic effect when exposed to the flash or light of a video camera. Further, it would be desirable to have an article, such as sports-related gear, that requires no external or internal power source to cause the illumination effect on film.

SUMMARY OF THE INVENTION

Therefore, a general object of this invention is to provide an article constructed of a reflective leather material that is not visible to the naked eye but is visible when recorded by a photograph or video camera.

Another object of this invention is to provide an article, as aforesaid, that appears illuminated without requiring electricity or battery power.

Still another object of this invention is to provide an article, as aforesaid, that provides a holographic effect recordable on digital media for publication on social media.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
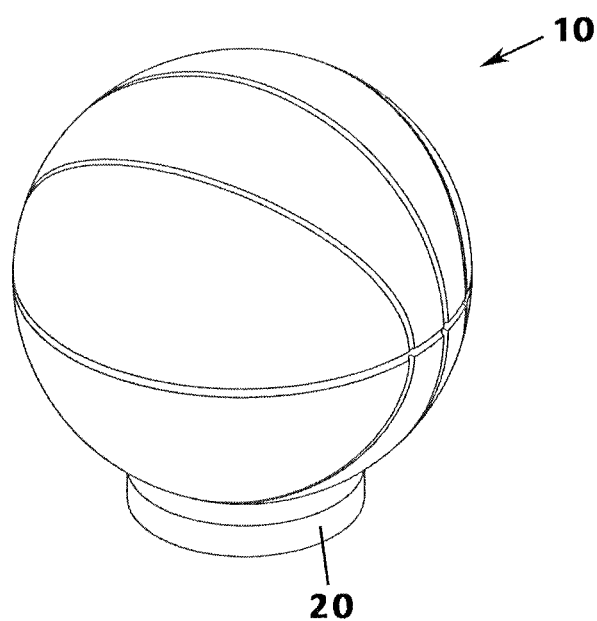
FIG. 1 is a perspective view of a holographic article according to the present invention.
Figure 2:
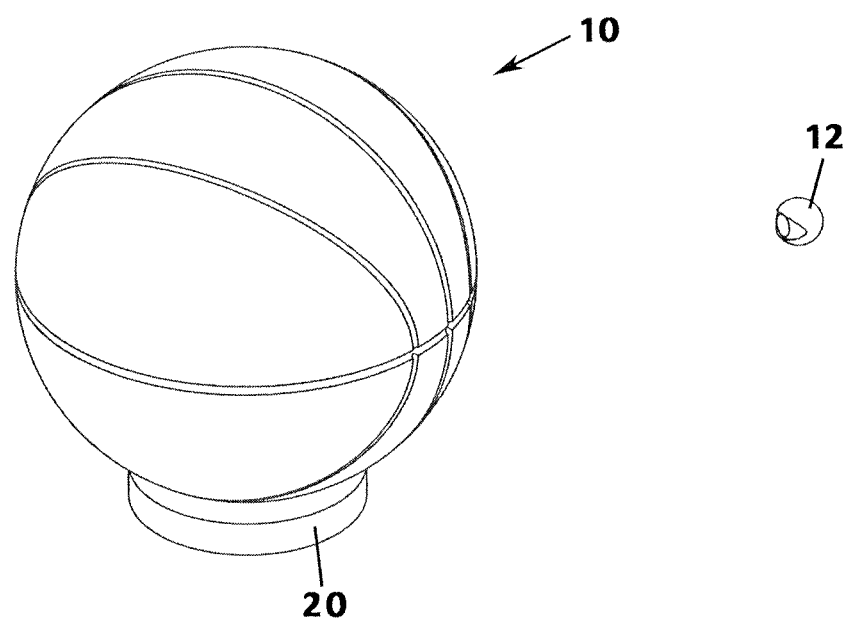
FIG. 2 is another perspective view of the holographic article of FIG. 1, illustrated as seen by the naked eye of a person.
Figure 3:
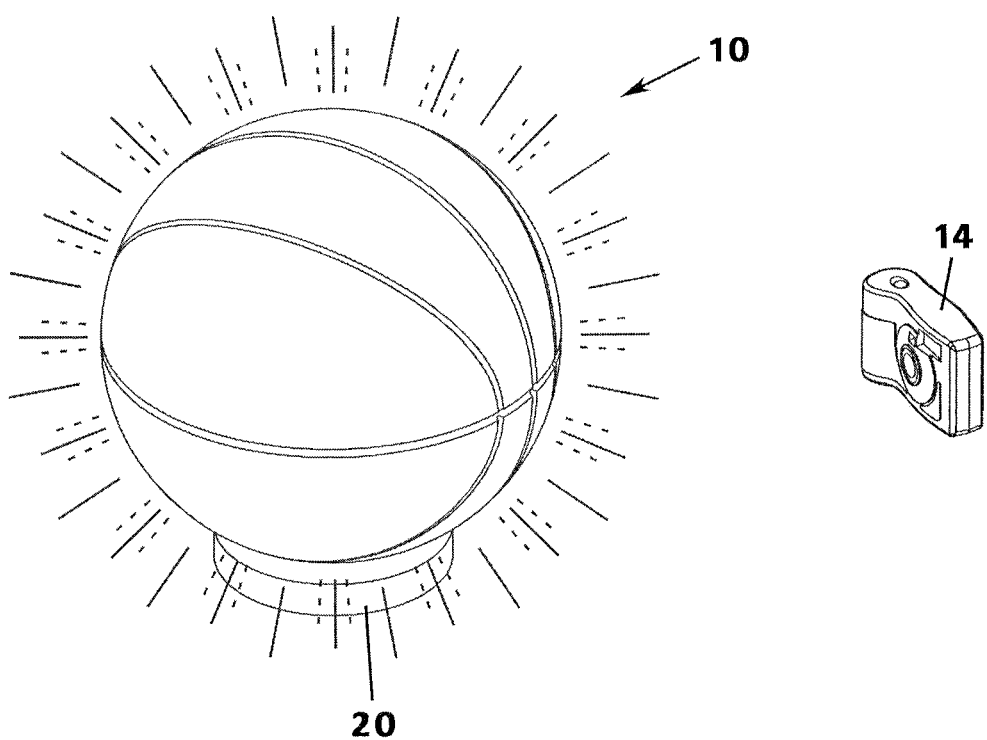
FIG. 3 is another perspective view of the holographic article of FIG. 1, illustrated as recorded on the film of a camera.

A holographic article according to a preferred embodiment of the present invention will now be described with reference to FIGS. 1 to 3 of the accompanying drawings. As shown, the holographic article 10 may be a basketball although the article may include other forms of sports-related gear or any other article. A method of making the holographic article and a method for producing a digital image of the holographic article are disclosed.

The holographic article 10 may be a basketball as shown, and may be mounted atop a base member 20 for stability, i.e. so it does not roll or bounce away. It is understood that the holographic article 10 is not for use in game play but rather to be displayed and, as will be described later, to be photographed or videotaped by a digital recording device having a light. It is understood that other sports gear that may be included in the spirit of the present invention may also include a base member which may be mounted to the respective article for stability and display. The holographic article may be a soccer ball, volleyball, football, backpack, or other sports related article.

Preferably, the holographic article 10, i.e. the basketball in the preferred embodiment, is constructed, in whole or in part, of a reflective leather material. In an embodiment, the article is covered, coated, or otherwise receives at least one layer of the reflective leather material. One such material having reflective properties is polyurethane ("PU") leather. PU leather is artificial leather which has been coated with polyurethane and may be applied to the surface of another article. This type of material has a generally black appearance when viewed by the naked eye 12 of a person (the eye of a person being represented by reference numeral 12)—even if subjected to a bright light (FIG. 2). However, the reflective leather material is operable to display a colorful illuminated appearance when recorded on film, e.g. via a camera 14 (FIG. 3), such as may be produced by a video recorder, photographic film, or even digital non-volatile media (i.e. a digital camera).

In use, a method for producing an article that is reflective when recorded via a videotape or digital camera includes selecting a suitable article to be modified (i.e. to be made to appear "holographic) and then applying at least one layer of reflective leather to it. In other words, an article desired to glow when recorded by a camera or videotape recorder is selected and then covered, such as in a manufacturing process, in whole or in part with the reflective material. Then, the article may be positioned and displayed in an environment where a photograph or video can be taken. Next, the article may be recorded by taking a photograph or video using a digital recording device having a flash or continuous light directed at the article 10. It is the light directed onto the reflective material that causes the holographic effects as recorded on the digital medium. The recorded image, almost magically, will glow or show an interesting "holographic" effect. Then, the recorded and saved image file may be posted on social media so as to publish a reflective, colorful, or holographic view of the article 10. Indeed, the produced image file may be saved, transmitted over the internet, communicated via blog, or otherwise sold in commerce.

It is understood that while certain forms of this invention have been illustrated and described, it is not limited thereto except insofar as such limitations are included in the following claims and allowable functional equivalents thereof.

What is claimed is:

1. A reflective article comprising:
   a body defining a shape of the article, the article having a reflective layer formed of a photo reflective polyurethane leather material that appears illuminated when a flash of a camera light is directed at it, the photo reflective polyurethane leather comprising a reflective layer coated with a polyurethane exterior layer, the reflective layer covering the article, wherein the polyurethane leather appears as a first color when not directly illuminated, and appears as a second, different color when the flash of the camera is directed at it;
   wherein the article is a sports ball, sports equipment, or a backpack.

2. The reflective article of claim 1 wherein the article is a basketball.

3. The reflective article of claim 1 wherein the article is one of a basketball, a soccer ball, a football, and a volleyball.

4. The reflective article of claim 1 wherein the reflective polyurethane leather material layer completely covers the article.

5. A method of making a reflective article comprising the steps of:
   obtaining an article;
   applying to the article a reflective layer formed of a photo reflective polyurethane leather material that appears illuminated when a flash of a camera light is directed at it, the photo reflective polyurethane leather comprising a reflective layer coated with a polyurethane exterior layer, the reflective layer covering the article, wherein the polyurethane leather appears as a first color when not directly illuminated, and appears as a second, different color when the flash of the camera is directed at it;
   wherein the article is a sports ball, sports equipment, or a backpack.

6. The method of claim 5 wherein the article is a basketball.

7. The method of claim 5 wherein the article is one of a basketball, a soccer ball, a football, and a volleyball.

8. The method of claim 5 wherein the step of applying comprises applying the reflective polyurethane leather material layer such that it completely covers the article.

9. A method for producing an image of an article that is reflective when recorded via a
   video recorder or a camera that uses flash photography, said method comprising:
   obtaining an article, the article having a reflective layer formed of a photo reflective polyurethane leather material that appears illuminated when a directed light is directed at it, the photo reflective polyurethane leather comprising a reflective layer coated with a polyurethane exterior layer, the reflective layer at least partially covering the article, wherein the polyurethane leather appears as a first color when not directly illuminated, and appears as a second, different color when the directed light is directed at it; and
   digitally recording a photograph or video of the article on a non-volatile storage medium.

10. The method of claim 9 wherein the article is a sports ball, backpack, or other sports equipment.

11. The method of claim 9 wherein the directed light is a flash of a camera.

12. The method of claim 9 wherein the article having the reflective polyurethane leather material layer completely covering the article.

13. The method of claim 9 wherein the step of digitally recording a photograph comprises the step of taking the photograph while the article has a light directed at it, the directed light causing the illuminating effect of the reflective layer.

14. The method of claim 9, wherein said layer of photo reflective material appears black without a direct light directed at it, and appears colorful or illuminated when a direct light is directed at it.

15. The method of claim 9 further comprising the step of displaying said digital recording on an electronic display.

16. The method as in claim 9, further comprising:
    transmitting said recorded image via a wide area network; and
    displaying said recorded image on a social media platform.

17. The method as in claim 9, further comprising selecting the article to be covered with said layer of photo reflective material.

18. The method as in claim 9, wherein the article is a basketball.

19. The method of claim 9 wherein the article is one of a basketball, a soccer ball, a football, and a volleyball.

20. The method of claim 9 wherein the article is a backpack.

* * * * *